(No Model.)

P. B. PAGE.
STRAIGHT WAY VALVE.

No. 314,708. Patented Mar. 31, 1885.

WITNESSES
Wm. M. Monroe,
Geo. W. King

INVENTOR
Peter B. Page,
by Leggett & Leggett
Attorneys

UNITED STATES PATENT OFFICE.

PETER B. PAGE, OF LORAIN, OHIO.

STRAIGHT-WAY VALVE.

SPECIFICATION forming part of Letters Patent No. 314,708, dated March 31, 1885.

Application filed November 19, 1884. (No model.)

*To all whom it may concern:*

Be it known that I, PETER B. PAGE, of Lorain, in the county of Lorain and State of Ohio, have invented certain new and useful Improvements in Straight-Way Valves; and I do hereby declare the following to be a full, clear, and exact description of the invention, such as will enable others skilled in the art to which it pertains to make and use the same.

My invention relates to improvements in two-seated "straight-way," so called, valves, the object being to improve the construction, to the end that the valves may be made at a less initial cost. A further object is to provide friction-surfaces at the joint of the valve-link and arm, enlarged circumferentially, to the end that the valve is held in any desired position more or less open by the friction of the parts under slight pressure at this joint.

With these objects in view my invention consists in certain features of construction and in combination of parts hereinafter described, and pointed out in the claim.

Figure 1:
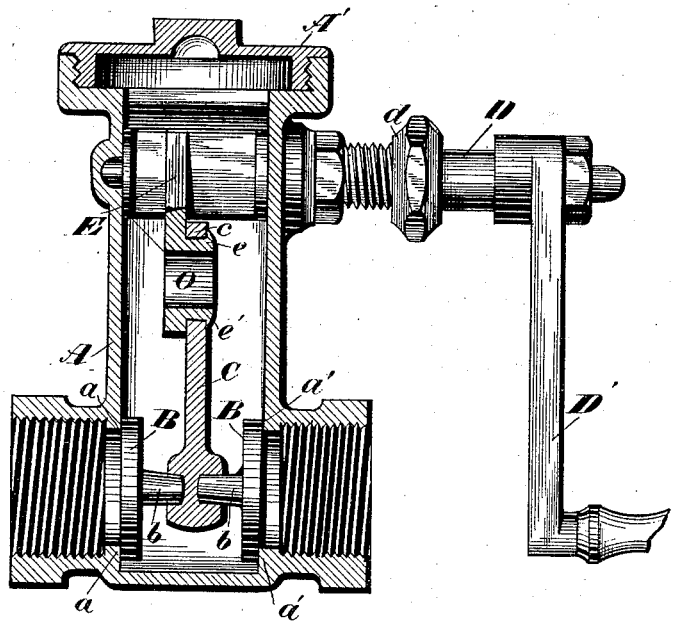
Figure 2:
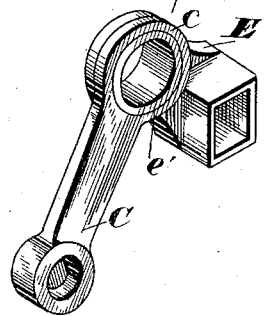

In the accompanying drawings, Figure 1 is a side elevation, partly in section, of my improved valve. Fig. 2 is an isometric view of the valve-link and arm.

A represents the casing, provided with the cap A' and the valve-seats $a$ and $a'$, that converge slightly as they extend downward.

B are the valves, that are provided with the bosses $b$, that are seated, respectively, in depressions on either side of the link C, the said bosses having an easy fit in the link, so that the faces of the valves can adjust themselves to the obliquity of the valve-seats. The stem D passes through the rear side of the casing, and has mounted thereon the crank-arm E, that is jointed to the link C, as shown. The stem D passes through a stuffing-box, $d$, of ordinary construction, and is provided with the hand-crank D'. In straight-way valves the stem is quite commonly arranged perpendicular to the passage-way and provided with a screw-thread for operating the valve; but with such construction the movement of the valve was too slow for many purposes. With the introduction of the arm and link a quick movement of the valve was had; but the difficulty then encountered was to make the valve stand in any position required. To overcome this difficulty various expedients were tried that were temporarily effective—such, for instance, as tightening the joint of the arm and link; but as there were usually only pivotal bearings at these joints, so great a pressure was required to balance the valve by reason of the frictional resistance acting on such a short leverage as was had around a mere pivot, and this pressure was concentrated on so small a surface, that the wear of the parts soon loosened the joint, so that the valve was not balanced or held in position, as required, after slight wear. I have therefore devised an enlarged joint at the union of the arm E and link C, by means of which and the consequent increased leverage from the axis of the joint to friction-surface the frictional resistance necessary to balance the valve, or, in other words, to hold the joint from turning as against the gravity of the valve and other parts of the mechanism, is so far reduced and is distributed over so large a surface that the amount of wear is merely nominal, by reason of which, when the joint has been properly adjusted to hold the valve as required, no further adjustment will be required for a long time, usually not until other repairs are needed about the valve.

As shown in Fig. 1, the end of the arm has a laterally-projecting annular rim, $e$, and the link at the upper end terminates in a band, $c$, that fits over the rim $e$, and the latter extends far enough through the band to admit of riveting or upsetting, as shown at $e'$, Fig. 1. The arm E extends beyond the rim, forming a ledge, E', so that an annular seat is had on the arm around the rim $e$ for the lateral abutment of the band $c$, and as the band and arm are pressed together by the riveting or upsetting at $e'$, the friction between these parts balances the valve, so that it stands in any position in which it may be left.

Owing to the enlarged joint, but little pressure is required to balance the valve, and the wear is but trifling, so that when once the pressure on the joint has been regulated, as aforesaid, the valve will remain balanced a long time. By removing the plug or cap A' the joint may be turned up above the casing and tightened without disconnecting the parts or removing the stem. Of course, the rim $e$ might be attached to the link and the band c to the arm with the same results. The opening O is only to save metal.

What I claim is—

The combination, with the casing, spindle, crank, arm, and rim e, of a single valve-link provided with the band c, and arranged to operate two valves connected with converging valve-seats, substantially as set forth.

In testimony whereof I sign this specification, in the presence of two witnesses, this 1st day of November, 1884.

PETER B. PAGE.

Witnesses:
N. O. SMITH,
FRANK HOGAN.